US00RE47886E

(19) United States
(12) Reissued Patent
Mathey et al.

(10) Patent Number: US RE47,886 E
(45) Date of Reissued Patent: Mar. 3, 2020

(54) TIRE WITH IMPROVED GRIP ON WET GROUND

(71) Applicants: Compagnie Generale Des Etablissements Michelin, Clermont-Ferranc (FR); Michelin Recherche Et Technique S.A., Granges-Paccot (CH)

(72) Inventors: Olivier Mathey, Clermont-Ferrand (FR); Olivier Durel, Clermont-Ferrand (FR)

(73) Assignees: COMPAGNIE GENERALE DES ETABLISSEMENTS MICHELIN, Clermont-Ferrand (FR); MICHELIN RECHERCHE ET TECNIQUE S.A., Granges-Paccot (CH)

(21) Appl. No.: 16/043,208

(22) Filed: Jul. 24, 2018

Related U.S. Patent Documents

Reissue of:
(64) Patent No.: 9,416,259
Issued: Aug. 16, 2016
Appl. No.: 14/416,776
PCT Filed: Jul. 24, 2013
PCT No.: PCT/EP2013/065626
§ 371 (c)(1),
(2) Date: Jan. 23, 2015
PCT Pub. No.: WO2014/016340
PCT Pub. Date: Jan. 30, 2014

(30) Foreign Application Priority Data

Jul. 25, 2012 (FR) ..... 12 57194

(51) Int. Cl.
*C08L 9/06* (2006.01)
*B60C 1/00* (2006.01)
*C08L 7/00* (2006.01)
*C08K 5/00* (2006.01)

(52) U.S. Cl.
CPC ..... *C08L 9/06* (2013.01); *B60C 1/0016* (2013.01); *C08L 7/00* (2013.01); *C08K 5/0016* (2013.01); *C08L 2205/02* (2013.01); *C08L 2205/035* (2013.01)

(58) Field of Classification Search
CPC ..... C08L 9/06; C08L 7/00; C08L 2205/035; C08L 2205/02; B60C 1/0016; C08K 5/0016
See application file for complete search history.

(56) References Cited

U.S. PATENT DOCUMENTS

| | | | | |
|---|---|---|---|---|
| 7,259,205 | B1 | 8/2007 | Pagliarini et al. | |
| 7,825,183 | B2 * | 11/2010 | Robert | B60C 1/0016 524/476 |
| 7,834,074 | B2 * | 11/2010 | Brunelet | B60C 1/00 524/318 |
| 8,324,310 | B2 * | 12/2012 | Robert | B60C 1/0016 524/474 |
| 8,499,805 | B2 * | 8/2013 | Maesaka | B60C 1/0016 152/209.1 |
| 2002/0183436 | A1 * | 12/2002 | Robert | B60C 1/0016 524/492 |
| 2003/0078335 | A1 * | 4/2003 | Hogan | C08C 19/44 524/492 |
| 2003/0080618 | A1 | 5/2003 | Krishnan | |
| 2005/0148713 | A1 | 7/2005 | Labauze | |
| 2010/0130664 | A1 * | 5/2010 | Rachita | C07F 7/1836 524/445 |
| 2013/0274404 | A1 * | 10/2013 | Vasseur | B60C 1/0016 524/526 |

FOREIGN PATENT DOCUMENTS

WO 2012069585 5/2012

OTHER PUBLICATIONS

Int'l Search Report for PCT/EP2013/065626, dated Oct. 23, 2013.

* cited by examiner

*Primary Examiner* — Jerry D Johnson
(74) *Attorney, Agent, or Firm* — Dickinson Wright PLLC

(57) ABSTRACT

A tire comprising at least a rubber composition based on at least a blend of natural rubber, NR, or synthetic polyisoprene, and a styrene-butadiene copolymer, SBR, the SBR having a content greater than or equal to 20 parts per hundred parts of elastomer, phr, a reinforcing filler comprising carbon black, characterized in that the composition comprises a plasticizing resin having a glass transition temperature, Tg, greater than or equal to 20° C. and that the SBR has a Tg greater than or equal to −65° C.

20 Claims, No Drawings

TIRE WITH IMPROVED GRIP ON WET GROUND

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a 371 national phase entry of PCT/EP2013/065626, filed 24 Jul. 2013, which claims benefit of French Patent Application No. 1257194, filed 25 Jul. 2012, the entire contents of which are incorporated herein by reference for all purposes.

BACKGROUND

1. Field

The disclosure relates to a rubber composition, especially for a tire tread, and more particularly for a tire intended to be fitted onto vehicles carrying heavy loads and running at a sustained speed, such as, for example, lorries, tractors, trailers or buses, aircraft, etc.

2. Description of Related Art

Certain current "road" tires are designed to run at high speed for ever longer distances, because of the improvement in the road network and the expansion of motorway networks throughout the world. However, since fuel savings and the need to protect the environment have become a priority, it has proved necessary to produce tires that have a reduced rolling resistance while continuing to improve the wet grip performance.

Thus it is known to use, in the elastomeric matrix of such tires, as a blend with natural rubber, styrene-butadiene copolymers (SBR) having a high Tg (greater than or equal to −65° C.), however the use of such elastomers increases the hysteresis losses and therefore degrades the rolling resistance of these tires.

SUMMARY

The Applicant companies have surprisingly discovered that the combination within a rubber composition, of a high Tg SBR and a high Tg (Tg greater than or equal to 20° C.) plasticizing resin made it possible to improve the wet grip of tires, the tread of which has such a composition. while retaining a very similar roiling resistance.

One subject of the invention is therefore a tire comprising at least a rubber composition based on at least a blend of natural rubber, NR, or synthetic polyisoprene, and a styrene-butadiene copolymer, SBR, the SBR having a content greater than or equal to 20 parts per hundred parts of elastomer, phr, a reinforcing filler comprising carbon black, characterized in that the composition comprises a plasticizing resin having a glass transition temperature, Tg, greater than or equal to 20° C., preferably greater than or equal to 30° C., and that the SBR has a Tg greater than or equal to −65° C.

The invention also relates, in an embodiment to a tire comprising a tread having a rubber composition based on at least a blend of natural rubber, NR, or synthetic polyisoprene, and of a styrene-butadiene copolymer, SBR, the SBR having a content greater than or equal to 20 parts per hundred parts of elastomer, phr, a reinforcing filler comprising carbon black, characterized in that the composition comprises a plasticizing resin having a glass transition temperature, Tg, greater than or equal to 20° C., and that the SBR has a Tg greater than or equal to −65° C.

I. MEASUREMENTS AND TESTS USED

The rubber compositions are characterized, after curing, as indicated below.

Dynamic Properties

The dynamic properties $\tan(\delta)_{max}$ and $\tan(\delta)_{-20°\ C.}$, are measured on a viscosity analyser (Metravib VA4000), according, to the standard ASTM D 5992-96. The response of a sample of vulcanized composition (cylindrical test specimen with a thickness of 4 mm and with a cross section 400 $mm^2$), subjected to a simple alternating sinusoidal shear stress, at a frequency of 10 Hz, is recorded.

For the measurement of $\tan(\delta)_{max}$, a strain amplitude sweep from 0.1% to 100% (forward cycle), then from 100% to 1% (return cycle) is carried out at 60° C. The results made use of are the loss factor (tan δ). For the return cycle, the maximum value of tan δ observed (tan $(\delta)_{max}$), between the values at 0.1% and at 100% strain (Payne effect), is indicated.

An arbitrary value of 100 is given for the control composition, a result greater than 100 indicating an increase in the value of $\tan(\delta)_{max}$, corresponding to a degradation of the rolling resistance.

For the measurement of $\tan(\delta)_{-20°\ C.}$, a temperature sweep is carried out, under a stress of 0.7 MPa, and the value of tan observed at −20° C. is recorded.

It should be remembered that, in a manner well known to a person skilled in the art, the value is representative of the wet grip potential: the higher the value of $\tan(\delta)_{-20°\ C.}$, the better the grip.

All arbitrary value of 100 is given for the control composition, a result greater than 100 indicating an increase in the value of $\tan(\delta)_{-20°\ C.}$, corresponding therefore to an improvement in the wet grip performance.

II. DETAILED DESCRIPTION OF SPECIFIC EMBODIMENTS OF THE INVENTION

The rubber composition according to an embodiment of the invention, which can be used for the manufacture of tire tread, comprises at least a blend of natural rubber or synthetic polyisoprene, and a styrene-butadiene copolymer (SBR) having a high Tg (greater than or equal to −65° C.) and having a content greater than or equal to 20 parts per hundred parts of elastomer, phr, a reinforcing filler comprising carbon black and a plasticizing resin having a glass transition temperature, Tg, greater than or equal to 20° C.

Unless expressly indicated otherwise, the percentages indicated in the present application are % by weight.

In the present description, unless expressly indicated otherwise, all the percentages (%) indicated are % by weight. Moreover, any range of values denoted by the expression "between a and b" represents the field of values ranging from more than a to less than b (that is to say limits a and b excluded) whereas any range of values denoted by the expression "from a to b" means the field of values ranging from a up to b (that is to say including, the strict limits a and b).

Diene Elastomer

What is meant by a "diene" elastomer (or interchangeably rubber) whether it is natural or synthetic, is, in a known manner, an elastomer consisting at least in part (i.e., a homopolymer or a copolymer) of diene monomer units (monomers bearing two conjugated or non-conjugated carbon-carbon double bonds).

The elastomeric matrix of the composition in accordance with an embodiment of the invention comprises at least:

natural rubber, NR, or synthetic polyisoprene, with a content ranging preferably from 30 phr to 80 phr, more preferably greater than or equal to 40 phr, more preferably still greater than or equal to 60 phr;

an SBR having a Tg (Tg, measured according to ASTM D3418) greater than or equal to −65° C., with a content greater than or equal to 20 phr, preferably with a content ranging from 20 to 80 phr, more preferably from 20 to 60 phr, and more preferably still from 20 to 40 phr. More preferably still, the SBR has a Tg greater than or equal to −50° C.

Advantageously, the elastomeric matrix may comprise a polybutadiene, BR, preferably in a content ranging from 5 to 40 phr, and more preferably from 10 to 30 phr.

The aforementioned elastomers may have any microstructure which depends on the polymerization conditions used, in particular on the presence or absence of a modifying and/or randomizing agent and on the amounts of modifying and/or randomizing agent employed. The elastomers can, for example, be block, statistical, sequential or microsequential elastomers and can be prepared in dispersion or in solution; they can be coupled and/or star-branched or else functionalized with a coupling and/or star-branching or functionalization agent. Mention may be made, for example, for coupling to carbon black, of functional groups comprising a C—Sn bond or aminated functional groups, such as aminobenzophenone, for example; mention may be made, for example, for coupling, to a reinforcing inorganic filler, such as silica, of silanol or polysiloxane functional groups having a silanol end (such as described, for example, in FR 2 740 778, U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909, U.S. Pat. No. 6,503,973, WO 2009/000750 and WO 2009/000752).

Mention may also be made, as functional elastomers, of those prepared by the use of a functional initiator, especially those bearing an amine or tin function (see for example WO 2010072761).

Mention may also be made, as other examples of functionalized elastomers, of elastomers (such as SBR, BR, NR or IR) of the epoxidized type.

It should be noted that the SBR may be prepared in emulsion ("ESBR") or in solution ("SSBR").

Whether it is an ESBR or SSBR, use is made in particular of an SBR having a moderate styrene content, for example of between 10% and 35% by weight, or a high styrene content, for example from 35% to 55%, a content of vinyl bonds of the butadiene part of between 15% and 70%, a content (mol %) of trans-1,4-bonds of between 15% and 75% and a Tg of between −10° C. and −65° C., preferably greater than or equal to −50° C.

As BR, those BRS having a content (mol %) of cis-1,4-linkages of greater than 90% are suitable.

The composition according to an embodiment of the invention may contain another diene elastomer. It being possible for the diene elastomers of the composition to be used in combination with any type of synthetic elastomer other than a diene elastomer, or even with polymers other than elastomers, for example thermoplastic polymers.

Reinforcing Filler, Coupling Agent and Covering Agent

In the present account, the BET specific surface area is determined in a known manner by gas adsorption using the Brunauer-Emmett-Teller method described in "The journal of the American Chemical Society", Vol. 60, page 309, February 1938, more specifically according to the French standard NF ISO 9277 of December 1996 (multipoint (5 points) volumetric method—gas: nitrogen—degassing: 1 hour at 160° C.—relative pressure range p/po: 0.05 to 0.17). The CTAB specific surface area is the external surface area determined according to the French standard NF T 45-007 of November 1987 (method B).

The composition of an embodiment of the invention comprises any type of reinforcing filler known for its abilities to reinforce a rubber composition that can be used for the manufacture of tires, for example an organic filler such as carbon black, a reinforcing inorganic filler such as silica, combined with which is, in a known manner, a coupling, agent, or else a mixture of these two types of filler.

Suitable as carbon blacks are all carbon blacks, especially the blacks conventionally used in tires or the treads thereof (tire-grade blacks). Among the latter, mention will more particularly be made of the reinforcing blacks of the 100, 200 or 300 series, or the blacks of 500, 600 or 700 series (ASTM grades), such as for example the N115, N134, N234, N326, N330, N339, N347, N375, N550, N683 and N772 blacks. These carbon blacks may be used in the isolated state, as available commercially, or in any other form, for example as a support for some of the rubber additives used. The carbon blacks might, for example, be already incorporated into the diene elastomer, in particular isoprene elastomer in the form of a masterbatch (see, for example, applications WO 97/36724 or WO 99/16600). Also suitable as carbon blacks are the carbon blacks partially or completely covered with silica via a post-treatment, or the carbon blacks modified in situ by silica such as, non-limitingly, the fillers sold by Cabot Corporation under the name Ecoblack™ "CRX 2000" or "CRX4000".

The carbon blacks having a CTAB specific surface area of between 75 and 200 $m^2/g$, and more particularly the carbon blacks having a CTAB specific surface area of between 100 and 150 $m^2/g$, such as the carbon blacks of 100 or 200 series, are suitable.

As examples of organic fillers other than carbon blacks, mention may be made of functionalized polyvinyl organic fillers as described in applications WO-A-2006/069792, WO-A-2006/069793, WO-A-2008/003434 and WO-A-2008/003435.

The expression "reinforcing inorganic filler" should be understood here to mean any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of pneumatic tires, in other words capable of replacing, in its reinforcing role, a conventional tire-grade carbon black; such a filler is generally characterized, in a known manner, by the presence of hydroxyl (—OH) groups at its surface.

Mineral fillers of the siliceous type, preferably silica ($SiC_2$), are suitable in particular as reinforcing inorganic fillers. The silica used may be any reinforcing silica known to a person skilled in the art. In particular any precipitated or fumed silica having a BET surface area and also a CTAB specific surface area that are both less than 450 $m^2/g$, preferably from 30 to 400 $m^2/g$, in particular between 60 and 300 $m^2/g$. Mention will be made, as highly dispersible precipitated silicas ("HDSs"), for example, of the "Ultrasil" 7000 and "Ultrasil" 7005 silicas from Degussa, the "Zeosil" 1165MP, 1135MP and 1115MP silicas from Rhodia, the "Hi-Sil" EZ150G silica from PPG, the "Zeopol" 8715, 8745 and 8755 silicas from Huber or the silicas with a high specific surface area as described in application WO 03/016387.

As reinforcing inorganic filler, mention may also be made of the mineral fillers of the aluminous type, in particular alumina ($Al_2O_3$) or aluminium (oxide)hydroxides, or else reinforcing, titanium oxides, for example described in U.S. Pat. Nos. 6,610,261 and 6,747,087.

The physical state in which the reinforcing inorganic filler is present is not important, whether it is in the form of a powder, of micropearls, of granules, or else of beads. Of course, the expression "reinforcing inorganic filler" is also understood to mean mixtures of various reinforcing inorganic fillers, in particular of highly dispersible silicas as described, above.

A person skilled in the art will understand that, as filler equivalent to the reinforcing inorganic filler described in the present section, a reinforcing :tiller of another nature, in particular organic nature such as carbon black, could be used provided that this reinforcing filler is covered with an inorganic layer such as silica, or else comprises functional sites, in particular hydroxyl sites, at its surface that require the use of a coupling agent in order to form the bond between the filler and the elastomer. By way of example, mention may be made, for example, of tire-grade carbon blacks as described, for example, in patent documents WO 96/37547 and WO 99/28380.

For the compositions in accordance with an embodiment of the invention, the content of total reinforcing filler (carbon black and/or reinforcing inorganic filler such as silica, etc.) is preferably between 20 and 200 phr, more preferably between 30 and 150 phr. More preferably still, the content of reinforcing filler ranges from 40 to 70 phr, in particular from 45 to 65 phr.

According to one embodiment of the invention, the composition comprises, besides the carbon black, an inorganic reinforcing filler with a preferential content of at least 10% of the total reinforcing filler and more preferably of at most 50% of the total reinforcing filler.

According to one embodiment variant of the invention, the inorganic filler comprises silica and preferably it consists preferably of silica.

In order to couple the reinforcing inorganic filler to the diene elastomer, use is made, in a well-known manner, of an at least bifunctional coupling agent (or bonding agent) intended to provide a satisfactory connection, of chemical and/or physical nature, between the inorganic filler (surface of its particles) and the diene elastomer. Use is made, in particular, of at least bifunctional organosilanes or polyorganosiloxanes.

The content of coupling agent is advantageously less than 20 phr, it being understood that it is in general desirable to use the least amount possible thereof. Typically the content of coupling agent represents from 0.5% to 15% by weight relative to the amount of inorganic filler. Its content is preferably between 0.5 and 12 phr, more preferably within a range extending from 3 to 10 phr. This content is easily adjusted by a person skilled in the art according to the content of inorganic filler used in the composition.

The rubber compositions may also contain coupling activators when a coupling agent is used, agents for covering the inorganic filler when an inorganic filler is used, or more generally processing aids capable, in a known manner, by virtue of an improvement in the dispersion of the filler in the rubber matrix and of a lowering of the viscosity of the compositions, of improving their ability to be processed in the uncured state. These covering, agents are well known (see for example patent applications WO 2006/125533, WO 2007/017060 and WO 2007/003408), mention will be made, for example, of hydroxysilanes or hydrolysable silanes, such as hydroxysilanes (see for example WO 2009/062733), alkylalkoxysilanes, in particular alkyltriethoxysilanes such as for example 1-octyltriethoxysilane, polyols (for example diols or triols), polyethers (for example polyethylene glycols), primary, secondary or tertiary amines (for example trialkanolamines), hydroxylated or hydrolysable polyorganosiloxanes (for example α,ω-dihydroxypolyorganosilanes (in particular α,ω-dihydroxypolydimethylsiloxanes) (see for example EP 0 784 072) and fatty acids such as for example stearic acid.

Hydrocarbon Plasticizing Resin

The rubber compositions of an embodiment of the invention use a hydrocarbon plasticizing resin, the Tg, glass transition temperature, of which is above 20° C. and the softening point of which is below 170° C., as explained in detail below.

In a manner known to a person skilled in the art, the term "plasticizing resin" is reserved in the present application, by definition, for a compound that is, on the one hand, solid at ambient temperature (23° C.) (in contrast to a liquid plasticizing compound such as an oil), and, on the other hand, compatible (that is to say, miscible at the level used, typically greater than 5 phr) with the rubber composition for which it is intended, so as to act as a true diluent.

Hydrocarbon resins are polymers well known to a person skilled in the art, which are therefore miscible by nature in the elastomer compositions when they are additionally described as "plasticizing".

They have been widely described in the patents or patent applications cited in the introduction of the present document, and also for example in the work entitled "Hydrocarbon Resins" by R. Mildenberg, M. Zander and G. Collin (New York, VCH, 1997, ISBN 3-527-28617-9) chapter 5 of which is devoted to the applications thereof, especially in the tire rubber field (5.5. "Rubber Tires and Mechanical Goods").

They may be aliphatic, naphthenic, aromatic or else of aliphatic/naphthenic/aromatic type, that is to say based on aliphatic and/or naphthenic and/or aromatic monomers, They may be natural or synthetic, and may or may not be petroleum-based (if such is the case, also known under the name of petroleum resins). They are preferably exclusively hydrocarbon-based, that is to say that they comprise only carbon and hydrogen atoms.

Preferably, the hydrocarbon plasticizing resin has at least one, more preferably all, of the following characteristics:

- a number-average molecular weight (Mn) of between 400 and 2000 g/mol;
- a polydispersity index (Ip) of less than 3 (reminder: Ip=Mw/Mn with Mw being the weight-average molecular weight).

More preferably, this hydrocarbon plasticizing resin has at least one, more preferably still all, of the following characteristics:

- a Tg above 30° C.;
- an Mn weight of between 500 and 1500 g/mol;
- an Ip index of less than 2.

The glass transition temperature Tg is measured in a known manner by DSC (Differential Scanning Calorimetry), according to the standard ASTM D3418 (1999), and the softening point is measured according to the standard ASTM E-28.

The macrostructure (Mw, Mn and Ip) of the hydrocarbon resin is determined by size exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "WATERS" columns in series ("STYRAGEL" HR4E, HR1 and HR0.5); detection by differential refractometer ("WATERS 2410") and its associated operating software ("WATERS EMPOWER").

According to one particularly preferred embodiment, the hydrocarbon plasticizing resin is selected from the group consisting of cyclopentadiene (abbreviated to CPD) or dicyclopentadiene (abbreviated to DCPD) homopolymer or copolymer resins, terpene homopolymer or copolymer resins, $C_5$-cut homopolymer or copolymer resins and the mixtures of these resins.

Among the above copolymer resins, use is preferably made of those selected from the group consisting of (D)CPD/vinylaromatic copolymer resins, (D)CPD/terpene copolymer resins, (D)CPD/$C_5$-cut copolymer resins, terpene/vinylaromatic copolymer resins, $C_5$-cut/vinylaromatic copolymer resins, and the mixtures of these resins.

The term "terpene" encompasses here, in a known manner, α-pinene, β-pinene and limonene monomers; use is preferably made of a limonene monomer, which compound exists, in a known manner, in the form of three possible isomers: L-limonene (laevorotatory enantiomer), D-limonene (dextrorotatory enantiomer), or else dipentene, racemate of the dextrorotatory and laevorotatory enantiomers.

Suitable vinylaromatic monomers are, for example, styrene, α-methylstyrene, ortho-, meta- and para-methylstyrene, vinyltoluene, para-tert-butylstyrene, methoxystyrenes, chlorostyrenes, vinylmesitylene, divinylbenzene, vinylnaphthalene, any vinylaromatic monomer derived from a $C_9$-cut (or more generally from a $C_8$- to $C_{10}$-cut). Preferably, the vinylaromatic compound is styrene or a vinylaromatic monomer derived from a $C_9$-cut (or more generally from a $C_8$- to $C_{10}$-cut). Preferably, the vinylaromatic compound is the minority monomer, expressed as a mole fraction, in the copolymer in question.

According to one more particularly preferred embodiment, the hydrocarbon plasticizing resin is selected from the group consisting of (D)CPD homopolymer resins, (D)CPD/styrene copolymer resins, polylimonene resins, limonene/styrene copolymer resins, limonene/D(CPD) copolymer resins, $C_5$-cut/styrene copolymer resins, $C_5$-cut/$C_9$-cut copolymer resins, and the mixtures of these resins.

The above preferred resins are well known to a person skilled in the art and are commercially available, for example sold, as regards the:

polylimonene resins: by DRT under the name "Dercolyte L120" (Mn=625 g/mol; Mw=1010 g/mol; Ip=1.6; Tg=72° C.) or by ARIZONA under the name "Sylvagum TR7125C" (Mn=630 g/mol; Mw=950 g/mol; Ip=1.5; Tg=70° C.);

$C_5$-cut/vinylaromatic copolymer resins, especially $C_5$-cut/styrene or $C_5$-cut/$C_9$-cut copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", and by Exxon under the names "Escorez 2101" and "ECR 373";

limonene/styrene copolymer resins: by DRT under the name "Dercolyte TS 105", and by ARIZONA Chemical Company under the names "ZT115LT" and "ZT5100".

The content of hydrocarbon resin preferably ranges from 1 to 20 phr. The content of hydrocarbon resin is more preferably still less than or equal to 10 phr.

Crosslinking System

The crosslinking system is preferably a vulcanization system, that is to say a system based on sulphur (or on a sulphur donor) and on a primary vulcanization accelerator. Added to this base vulcanization system, incorporated during the first non-productive phase and/or during the productive phase as described subsequently, are various known secondary vulcanization accelerators or vulcanization activators such as zinc oxide, stearic acid or equivalent compounds, and guanidine derivatives (in particular dipheny lguanidine).

The sulphur is used at a preferred content of between 0.5 and 10 phr, more preferably between 1 and 8 phr, in particular between 1 and 6 phr when the composition of the invention is intended, according to a preferred embodiment of the invention, to constitute an inner "liner" (or rubber composition) of a tire. The primary vulcanization accelerator is used in a preferred content of between 0.5 and 10 phr, more preferably of between 0.5 and 5.0 phr.

Use may be made, as accelerator, of any compound capable of acting as an accelerator of the vulcanization of diene elastomers in the presence of sulphur, in particular accelerators of the thiazole type and also derivatives thereof, and accelerators of thiuram and zinc dithiocarbamate types. These primary accelerators are more preferably selected from the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert-butyl-2-benzothiazyl sulphenamide (abbreviated to "TBBS"), N-tert-butyl-2-benzothiazyl sulphenimide (abbreviated to "TBSI") and mixtures of these compounds.

Other Constituents

The rubber matrices of the composites in accordance with the invention also comprise all or some of the additives customarily used in the rubber compositions intended for the manufacture of motor vehicle ground-contact systems, in particular tires, such as for example anti-ageing agents, antioxidants, plasticizers or extending oils, whether the latter are of aromatic or non-aromatic nature, in particular oils that are very slightly aromatic or non-aromatic (e.g. naphthenic or paraffinic oils, MES or TDAE oils), agents that improve the processability of the compositions in the uncured state, a crosslinking system based either on sulphur, or on sulphur donors and/or peroxide, vulcanization accelerators, activators or retarders, anti-reversion agents such as for example sodium hexathiosulphonate or N,N'-m-phenylene-biscitraconimide, methylene acceptors and donors (for example resorcinol, HMT or H-3M) or other reinforcing resins, bismaleimides, other systems for promoting adhesion with respect to metallic reinforcers, especially brass reinforcers, such as for example those of "RFS" (resorcinol-formaldehyde-silica) type, or else other metal salts such as for example organic salts of cobalt or nickel. A person skilled in the art will know how to adjust the formulation of the composition depending on his specific requirements.

Preparation of the Rubber Compositions

The compositions are manufactured in appropriate mixers, using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically below 110° C., finishing phase during which the crosslinking system is incorporated.

By way of example, the non-productive phase is carried out in a single thermomechanical step of a few minutes (for example between 2 and 10 min) during which all the necessary base constituents and other additives, with the exception of the crosslinking or vulcanization system, are introduced into an appropriate mixer such as a standard internal mixer. After cooling the mixture thus obtained, the vulcanization system is then incorporated in an external mixer such as an open mill, maintained at low temperature (for example between 30° C. and 100° C.). Everything is then mixed (productive phase) for a few minutes (for example between 5 and 15 min).

The final composition thus obtained may then be calendered, for example in the form of a sheet or a slab, or else extruded, for example in order to form a robber profiled element used for the manufacture of a composite or a semi-finished product, such as for example plies, treads, sublayers, and other blocks of rubber reinforced by metallic reinforcers, intended to form for example a part of the structure of a tire.

The vulcanization (or curing) may then be carried out in a known manner at a temperature generally between 130° C. and 200° C., preferably under pressure, for a sufficient time that may vary for example between 5 and 90 min depending in particular on the curing temperature, the vulcanization system used and the vulcanization kinetics of the composition in question.

It will he noted that the invention relates to rubber compositions previously described as both in the "uncured" state (i.e. before curing) and in the "cured" or vulcanized state (i.e. after vulcanization).

III—EXEMPLARY EMBODIMENTS OF THE INVENTION

The following examples make it possible to illustrate the invention, the latter not however being limited to these examples alone.

Preparation of the Rubber Compositions

The tests which follow are carried out in the following manner: introduced into an internal mixer, Which is 70% filled and has an initial vessel temperature of approximately 50° C., are the mixed diene elastomers (NR, SBR and where appropriate BR), the reinforcing filler (carbon black and, where appropriate, silica), where appropriate the coupling agent (when the latter is present) then, after kneading for one to two minutes, the various other ingredients, with the exception of the vulcanization system, are introduced. Thermomechanical working (non-productive phase) is then carried out in one step (total kneading time equal to around 5 min), until a maximum "dropping" temperature of around 165° C. is reached. The mixture thus obtained is recovered and cooled and then the vulcanization system (sulphur and sulphenamide accelerator) is added on an external mixer (homofinisher) at 70° C., all the ingredients being mixed (productive phase) for around 5 to 6 min.

The compositions thus obtained are then calendered either in the form of slabs (thickness of 2 to 3 mm) or thin sheets of rubber, for the measurement of their physical or mechanical properties, or in the form of profiled elements that can be used directly, after cutting and/or assembling to the desired dimensions, for example as semi-finished products for tires, in. particular as tire treads.

III-3 Characterization of the Rubber Compositions

III-3.1 Test 1

The purpose of this test is to demonstrate the improved properties of compositions in accordance with an embodiment of the invention compared to control compositions conventionally used in road tire treads.

For this, six compositions based ono 40/20/40 phr NR/BR/SBR blend reinforced by carbon black were prepared.

These six compositions differ essentially by the following technical features:

- the control composition C1 is a control composition conventionally used comprising an SSBR with a Tg of −65° C. and without plasticizing resin,
- the control composition C2 comprises an SSBR with a Tg, of −65° C. and a high Tg (44° C.) plasticizing resin,
- the control composition C3 comprises an SSBR with a Tg of −65° C. and a high Tg (72° C.) plasticizing resin,
- the control composition C4 comprises a high Tg (−48° C.) SSBR without plasticizing resin,
- the composition in accordance with the invention C5 comprises a high Tg (−48° C.) SSBR and a high Tg (44° C.) plasticizing resin,
- the composition in accordance with the invention C6 comprises a high Tg (−48° C.) SSBR and a high Tg (72° C.) plasticizing resin.

Tables 1 and 2 give, respectively, the formulation of the various compositions (Table 1—content of the various products expressed in phr) and the properties after curing (around 30 min at 140° C.).

It will be noted that the accelerator content of the various compositions is adjusted with respect to the presence of resin as a person skilled in the art knows how to do, so that these compositions can be comparable with identical curing conditions (time and temperature).

Examination of Table 2 shows that the addition of an aliphatic or terpenic high Tg resin (compositions C2 and C3) to a conventional control formulation (C1) makes it possible to obtain an improvement in the wet grip properties (improved value of tan(δ)−20° with a slight increase in the roiling resistance (value of $\tan(\delta)_{max}$). Similarly, composition C4 (having a high Tg SBR but without high Tg plasticizing resin) relative to the conventional control composition C1 also exhibits an improvement in the wet grip properties (improved value of tan(δ)−20° with a slight increase in the roiling resistance. But it is surprisingly observed that the compositions C5 and C6 in accordance with the invention comprising both a high Tg SBR and a high Tg resin, permit, with respect to the composition C1, a very significant improvement in the wet grip properties accompanied by a degradation of the rolling resistance performance, but that remains small. These results for the compositions C5 and C6 in accordance with the invention go well beyond a simple additivity of the effect of the high Tg SBR and of the high Tg resin (effect obtained for composition C2 or C3 added to the effect obtained for composition C4) and demonstrate a true synergy between these constituents in the compositions in accordance with the invention.

III-3.2 Test 2

The purpose of this test is to demonstrate the improved properties of compositions in accordance with the invention with formulations different from those of test 1, compared to control compositions conventionally used in road tire treads.

For this, six compositions were prepared, two compositions based on a 60/20/20 NR/BR/SBR elastomeric blend reinforced by carbon black, two compositions based on a 60/15/25 NR/BR/SBR elastomeric blend reinforced by carbon black and silica and two compositions based on an 80/20 NR/SBR elastomeric blend reinforced by carbon black.

These six compositions differ essentially by the following technical features:

- the control compositions C7, C9 and C11 are control compositions conventionally used comprising an SSBR with a Tg, of −65° C. and without plasticizing resin,
- the compositions in accordance with the invention C8, C10 and C12 comprise a high Tg (−48° C.) SSBR and a high Tg (44° C.) plasticizing resin.

Tables 3 and 4 give, respectively, the formulation of the various compositions (Table 3—content of the various products expressed in phr) and the properties after curing (around 30 minutes at 140° C.).

As in the preceding test, the accelerator content of the various compositions is adjusted with respect to the presence of resin as a person skilled in the art knows how to do, so that these compositions can be comparable with identical curing conditions (time and temperature).

It is surprisingly observed that the compositions C8, C1.0 and C12 in accordance with an embodiment of the invention comprising both a high Tg SBR and a high Tg resin, permit, with respect to the control compositions C7, C9 and C11, respectively a very significant improvement in the wet grip properties although accompanied by a slight degradation of the rolling resistance performance.

III-3.3 Test 3

The purpose of this test is to demonstrate the improved properties of compositions in accordance with the invention with formulations different from those of tests 1 and 2, compared to control compositions conventionally used in road tire treads.

For this, two compositions based on a 60/10/30 phr NR/BR/SBR blend reinforced by carbon black were prepared.

These four compositions differ essentially by the following technical features:

- the control composition C13 is a control composition conventionally used comprising an SSBR with a Tg of −65° C. and without plasticizing resin,
- the composition in accordance with the invention C14 comprises a high Ig (−48° C.) SSBR and a high Tg (44° C.) plasticizing resin.

Tables 5 and 6 give, respectively, the formulation of the various compositions (Table 5—content of the various products expressed in phr) and the properties after curing (around. 30 min at 140° C.).

The accelerator content of the various compositions is adjusted with respect to the presence of resin as a person skilled in the art knows how to do, so that these compositions can be comparable with identical curing, conditions (time and temperature).

Examination of Table 6 surprisingly shows that the composition C16 in accordance with the invention comprising both a high Tg SBR and a high Tg resin, permits, with respect to the control composition C13, a very significant improvement in the wet grip properties accompanied by a degradation of the rolling resistance performance, but that remains small.

Thus, for compositions in accordance with the invention comprising both high Tg SBRs and high Tg reinforcing resins, with various elastomeric blends and various reinforcing fillers, a surprising effect is observed on the wet grip properties without too great a degradation of the rolling resistance properties.

TABLE 1

| | Composition No. | | | | | |
|---|---|---|---|---|---|---|
| | C1 | C2 | C3 | C4 | C5 | C6 |
| NR (1) | 40 | 40 | 40 | 40 | 40 | 40 |
| BR (2) | 20 | 20 | 20 | 20 | 20 | 20 |
| SBR (3) | 40 | 40 | 40 | — | — | — |
| SBR (4) | — | — | — | 40 | 40 | 40 |
| Carbon black (5) | 54 | 54 | 54 | 54 | 54 | 54 |
| Resin (6) | — | 8 | — | — | 8 | — |
| Resin (7) | — | — | 8 | — | — | 8 |
| Paraffin | 1 | 1 | 1 | 1 | 1 | 1 |
| Antioxidant (8) | 2 | 2 | 2 | 2 | 2 | 2 |
| ZnO (9) | 2.4 | 2.4 | 2.4 | 2.4 | 2.4 | 2.4 |
| Stearic acid (10) | 2 | 2 | 2 | 2 | 2 | 2 |
| Sulphur | 1.1 | 1.1 | 1.1 | 1.1 | 1.1 | 1.1 |
| Accelerator (11) | 1.1 | 1.25 | 1.35 | 1.1 | 1.25 | 1.35 |

(1) Natural rubber (2) Neodymium Polybutadiene 98% 1,4-Cis,Tg = −108° C.

(3) Non-extended, tin-functionalized SBR solution with 24% 1,2-polybutadiene units, 15.5% styrene, Tg = −65° C.

(4) Non-extended, tin-functionalized SBR solution with 24% 1,2-polybutadiene units, 26.5% styrene, Tg = −48° C.

(5) Carbon black N234

(6) $C_5$-cut/$C_9$ -cut resin sold by Cray Valley under the name "Resine THER 8644" (Tg = 44° C.)

(7) polylimonene resin sold by DRT under the name "Dercolyte L120" (Tg = 72° C.)

(8) N-1,3-dimethylbutyl-N-phenyl-para-phenylenediamine sold by Flexsys under the name "Santoflex 6-PPD"

(9) zinc oxide (industrial grade - sold by Umicore)

(10) stearin sold by Uniqema under the name "Pristerene 4931"

(11) N-cyclohexyl-2-benzothiazyl sulphenamide sold by Flexsys under the name "Santocure CBS"

TABLE 2

| Properties | Composition No. | | | | | |
|---|---|---|---|---|---|---|
| after curing | C1 | C2 | C3 | C4 | C5 | C6 |
| $\tan(\delta)_{max}$ | 100 | 103 | 103 | 105 | 112 | 108 |
| $\tan(\delta)_{-20°\ C.}$ | 100 | 108 | 117 | 126 | 151 | 152 |

TABLE 3

| | Composition No. | | | | | |
|---|---|---|---|---|---|---|
| | C7 | C8 | C9 | C10 | C11 | C12 |
| NR (1) | 60 | 60 | 60 | 60 | 80 | 80 |
| BR (2) | 20 | 20 | 15 | 15 | — | — |
| SBR (3) | 20 | — | 25 | — | 20 | — |
| SBR (4) | — | 20 | — | 25 | — | 20 |
| Carbon black (5) | 54 | 54 | 51 | 51 | 54 | 54 |
| Silica (12) | — | — | 7 | 7 | — | — |
| Silane (13) | — | — | 0.6 | 0.6 | — | — |
| Resin (6) | — | 8 | — | 8 | — | 8 |
| Paraffin | 1 | 1 | 1 | 1 | 1 | 1 |
| Antioxidant (8) | 2 | 2 | 2 | 2 | 2 | 2 |
| ZnO (9) | 2.4 | 2.4 | 2.4 | 2.4 | 2.4 | 2.4 |
| Stearic acid (10) | 2 | 2 | 2 | 2 | 2 | 2 |
| Sulphur | 1.1 | 1.1 | 1.1 | 1.1 | 1.1 | 1.1 |
| Accelerator (11) | 1.1 | 1.25 | 1.25 | 1.45 | 1.1 | 1.25 |

(12) "ZEOSIL 1165 MP" silica from Rhodia in the form of micropearls (BET and CTAB: around 150-160 $m^2/g$);

(13) TESPT ("SI69" from Evonik-Degussa).

TABLE 4

| Properties after curing | Composition No. C7 | C8 | C9 | C10 | C11 | C12 |
|---|---|---|---|---|---|---|
| $\tan(\delta)_{max}$ | 100 | 107 | 100 | 102 | 100 | 113 |
| $\tan(\delta)_{-20°\ C.}$ | 100 | 130 | 100 | 134 | 100 | 148 |

TABLE 5

| Composition No. | C13 | C14 |
|---|---|---|
| NR (1) | 60 | 60 |
| BR (2) | 10 | 10 |
| SBR (3) | 30 | — |
| SBR (4) | — | 30 |
| Carbon black (5) | 62 | 62 |
| Resin (6) | — | 8 |
| Paraffin | 1 | 1 |
| Antioxidant (8) | 2 | 2 |
| ZnO (9) | 2.4 | 2.4 |
| Stearic acid (10) | 2 | 2 |
| Sulphur | 1 1 | 1.1 |
| Accelerator (11) | 1.1 | 1.25 |

TABLE 6

| Properties after curing | Composition No. C13 | C14 |
|---|---|---|
| $\tan(\delta)_{max}$ | 100 | 108 |
| $\tan(\delta)_{-20°C.}$ | 100 | 133 |

The invention claimed is:

1. A tire comprising at least a rubber composition based on at least:

a blend of natural rubber, NR, or synthetic polyisoprene, *wherein the content of NR or synthetic polyisoprene ranges from 30 phr to 80 phr*, and a styrene-butadiene copolymer, SBR, the SBR having a content greater than or equal to 20 parts per hundred parts of elastomer, phr, a reinforcing filler comprising carbon black, and a plasticizing resin having a glass transition temperature, Tg, greater than or equal to 20° C., wherein the SBR has a Tg greater than [or equal to ] −65° C.

2. The tire according to claim 1, wherein the SBR content ranges from 20 phr to 80 phr.

3. The tire according to claim 2, wherein the SBR content ranges from 20 to 60 phr.

4. The tire according to claim 1, wherein the composition is further based on a polybutadiene, BR.

[5. The tire according to claim 1, wherein the content of NR or synthetic polyisoprene ranges from 30 phr to 80 phr.]

6. The tire according to claim [5] *1*, wherein the content of NR or synthetic polyisoprene is greater than or equal to 40 phr.

7. The tire according to claim 6, wherein the content of NR or synthetic polyisoprene is greater than or equal to 60 phr.

8. The tire according to claim 1, wherein the SBR has a Tg greater than or equal to −50° C.

9. The tire according to claim 1, wherein the carbon black has a CTAB specific surface area of between 75 and 200 $m^2/g$.

10. The tire according to claim 9, wherein the carbon black has a CTAB specific surface area of between 100 and 150 $m^2/g$.

11. The tire according to claim 1, wherein the plasticizing resin has a Tg greater than or equal to 30° C.

12. The tire according to claim 1, wherein the content of plasticizing resin ranges from 1 to 20 phr.

13. The tire according to claim 12, wherein the content of plasticizing resin is less than or equal to 10 phr.

14. The tire according to claim 1, wherein the content of reinforcing filler ranges from 20 to 200 phr.

15. The tire according to claim 14, wherein the content of reinforcing filler ranges from 40 to 70 phr.

16. The tire according to claim 1, wherein the reinforcing filler comprises an inorganic filler.

17. The tire according to claim 16, wherein the inorganic filler constitutes at least 10% by weight of the total reinforcing filler.

18. The tire according to claim 16, wherein the inorganic filler constitutes at most 50% by weight of the total reinforcing filler.

19. The tire according to claim 16, wherein the inorganic filler comprises silica.

20. The tire according to claim 19, wherein the inorganic filler consists of silica.

21. The tire comprising a tread having a rubber composition according to claim 1.

* * * * *